(12) United States Patent
Benett et al.

(10) Patent No.: US 6,209,928 B1
(45) Date of Patent: *Apr. 3, 2001

(54) MICROFLUIDIC INTERCONNECTS

(75) Inventors: William J. Benett, Livermore; Peter A. Krulevitch, Pleasanton, both of CA (US)

(73) Assignee: The Regents of the University of California, Oakland, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,769

(22) Filed: Jun. 4, 1998

(51) Int. Cl.⁷ .................................................. F16L 39/00
(52) U.S. Cl. ....................................... 285/124.1; 285/348
(58) Field of Search ............................. 285/120.1, 124.1, 285/124.3, 216, 338, 343, 347, 348, 353, 148.23, FOR 118, FOR 159, 9.2, 124.5

(56) References Cited

U.S. PATENT DOCUMENTS

| | | | |
|---|---|---|---|
| 3,430,990 | * | 3/1969 | Nelson ............................... 285/348 X |
| 3,809,413 | * | 5/1974 | Boisserand ........................... 285/348 |
| 4,171,559 | * | 10/1979 | Vyse et al. . |
| 4,191,408 | * | 3/1980 | Acker ................................. 285/348 X |
| 4,630,847 | * | 12/1986 | Blenkush .......................... 285/347 X |
| 4,700,743 | * | 10/1987 | L'Henaff et al. . |
| 5,037,142 | * | 8/1991 | Helping ...................... 285/148.13 X |
| 5,667,305 | * | 9/1997 | Walker . |
| 5,669,637 | * | 9/1997 | Chitty et al. ...................... 285/348 X |
| 5,865,474 | * | 2/1999 | Takahashi .......................... 285/124.1 |
| 6,070,916 | * | 6/2000 | Rowley ............................. 285/332 X |
| 6,089,623 | * | 7/2000 | Schroeder et al. .................... 285/353 |

FOREIGN PATENT DOCUMENTS

| | | | |
|---|---|---|---|
| 114356 | * | 12/1941 | (AU) ..................................... 285/347 |
| 1031997 | * | 6/1958 | (DE) ............................ 285/FOR 159 |
| 2229291 | * | 1/1974 | (DE) ............................ 285/FOR 118 |
| 551006 | * | 2/1943 | (GB) ..................................... 285/343 |

OTHER PUBLICATIONS

OMNIFIT, Precision Chromatography Products, Oct. 1974.*

* cited by examiner

Primary Examiner—Lynne H. Browne
Assistant Examiner—Greg Binda
(74) Attorney, Agent, or Firm—Alan H. Thompson; L. E. Carnahan

(57) ABSTRACT

A miniature connector for introducing microliter quantities of solutions into microfabricated fluidic devices. The fluidic connector, for example, joins standard high pressure liquid chromatography (HPLC) tubing to 1 mm diameter holes in silicon or glass, enabling ml-sized volumes of sample solutions to be merged with μl-sized devices. The connector has many features, including ease of connect and disconnect; a small footprint which enables numerous connectors to be located in a small area; low dead volume; helium leak-tight; and tubing does not twist during connection. Thus the connector enables easy and effective change of microfluidic devices and introduction of different solutions in the devices.

6 Claims, 6 Drawing Sheets

MICROFLUIDIC INTERCONNECTS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to microfabricated fluidic devices, particularly to fluidic connectors, and more particularly to miniature (milli to micro) connectors for introducing fluids to microfabricated fluidic devices or interconnecting various microfluidic devices.

While the ability to fabricate micron-scale mechanical and fluidic structures out of silicon, glass, and plastic is advancing rapidly, one of the main challenges continues to be interfacing these microfabricated devices to each other and to the outside, macroscopic world. Very little effort has been directed to meet this need. For example, institutions performing leading-edge microfluidics research are still connecting devices using epoxy, which is permanent, can cause channel clogging, and cannot withstand significant pressures or other mechanical loading. There is great promise for miniature deployable microfluidic systems which monitor the environment for airborne toxicants, and hand-held medical diagnostic instruments incorporating microfluidic chips. However, introducing fluid samples and reagents into the microfluidic device is challenging, especially when multiple inputs are required.

The present invention directly addresses this need in a manner which is easy to connect and disconnect without the problem of tube twisting during installation. Also, the present invention utilizes no adhesives to make the connection, thus providing a means for quick and easy exchange of microfabricated components. Further, the miniature connectors of the present invention have a low dead volume, are helium leak-tight, can withstand high pressures, and have a small footprint, allowing for multiple connections to be made in a very small area, thereby retaining the advantages of miniaturization.

SUMMARY OF THE INVENTION

It is an object of the invention to provide miniature connectors for introducing fluids, either liquid or gaseous, into microfluidic devices.

A further object of the invention is to provide a fluidic connector which is easy to connect and disconnect multiple times, and no tools are required to connect and disconnect tubing.

A further object of the invention is to provide a miniature fluidic connector which allows for ease of design and manufacture of the packaging required for microfluidic devices.

A further object of the invention is to provide fluidic connectors applicable to many types of microfluidic devices without redesign, making the connector suitable as a standard approach for interfacing microfluidic devices to larger fluidic components and to each other.

A further object of the invention is to provide a miniature connector which uses standard tubing, allowing for adaptation to systems using standard connection systems, such as HPLC connectors.

Another object of the invention is to provide a miniature fluidic connector using no epoxy or adhesive, has a small footprint, is helium leak-tight, and is suitable for high pressure (hundreds to thousands of psi) applications where the inner diameters of the tubing and microfluidic device are small (mm to $\mu$m).

Another object of the invention is to enable multiple connections in a small area.

Another object of the invention is to provide micro-sized, multiple fluidic connections made simultaneously using an array of tubes held by a plug-in strip or polar manifold connector.

Another object of the invention is to provide miniature fluidic connectors that utilize stiff tubing wherein the tubing tip is inserted into the microfluidic device and a ferrule and o-ring, two o-rings without a ferrule, or molded gasket, engage with a formed end of the tubing to create a leakproof seal and mechanically lock the tubing in place.

Other objects and advantages of the present invention will become apparent from the following description and accompanying drawings.

Basically, the present invention involves micro-fluidic interconnects utilizing a fluidic connector suitable for introducing or removing gas or liquids to or from microfluidic devices. The connector interfaces one microfluidic device with another, or with a larger fluidic component and is adaptable to many types of microfluidic devices, making it an excellent candidate for a standard connector. The connector can withstand hundreds to thousands of psi pressure. The connector is easy to assemble and disassemble, requiring no tools or adhesives, uses standard tubing, is extremely compact, can be used to make multiple connections in a small area, and requires only simple packaging of the microfluidic device. The present invention is suitable for making fluidic connections to microfluidic devices used for many applications, such as portable and/or deployable counter-biological warfare systems, including PCR and flow-cytometer-based instruments; devices for sequencing or manipulating DNA; handheld, portable, or bench-top microfluidic-based medical diagnostic instruments; microfluidic devices for drug discovery, chemical analysis, and environmental monitoring; micro-channel heat sinks; and fluid droplet ejectors such as ink jet print heads.

The miniature connector of the present invention is made using machining, molding, or otherwise forming the end of a stiff tubing, such as polyetheretherbetone (PEEK), so that the tip of the tubing inserts into the microfluidic device and such that a ferrule and o-ring, or gasket, or two o-rings, engage with a formed (grooved) end of the tubing to create a leakproof seal and mechanically lock the tubing in place. The connector can be incorporated into a design having multiple connections which are made simultaneously using an array of tubes held by a plug-in strip or a polar manifold type connector.

In one embodiment, a screw is used to press a ferrule onto an o-ring or gasket, compressing the o-ring or gasket into a formed tip of the tubing and simultaneously forming a seal and providing mechanical retaining strength. In another embodiment, the tip of the formed tubing does not fit within a hole in the microfluidic device, but makes butted contact therewith. In another embodiment, two o-rings are used without a ferrule to engage the formed tip of the tubing. In another embodiment, a molded gasket is used to engage the formed tip of the tubing. The o-ring or gasket material is an appropriate polymer which has adequate compressibility, optimizes wear resistance, withstands high temperature, or is chemically inert, depending on the demands of the specific application.

In one embodiment, a small cartridge holding the o-rings or gasket is plugged into the package for the microfluidic device by trapping it within a standard sized counter-drilled hole, or screwing it into a standard tapped hole. This approach eliminates the need to handle the o-rings, eliminates the ferrule, and simplifies installation of the connector. After installation of the cartridge, it does not have to be removed. The tubing is connected by plugging it into the cartridge and can be disconnected by pulling on it with sufficient force. When the tubing is inserted, it compresses the o-rings or gasket, forming a seal and providing mechanical retaining strength.

BRIEF DESCRIPTION OF THE DRAWINGS

The accompanying drawings, which are incorporated into and form a part of the disclosure, illustrate embodiments of the invention and a procedure for carrying out the invention, and, together with the description, serve to explain the principles of the invention.

DETAILED DESCRIPTION OF THE INVENTION

Figure 1:
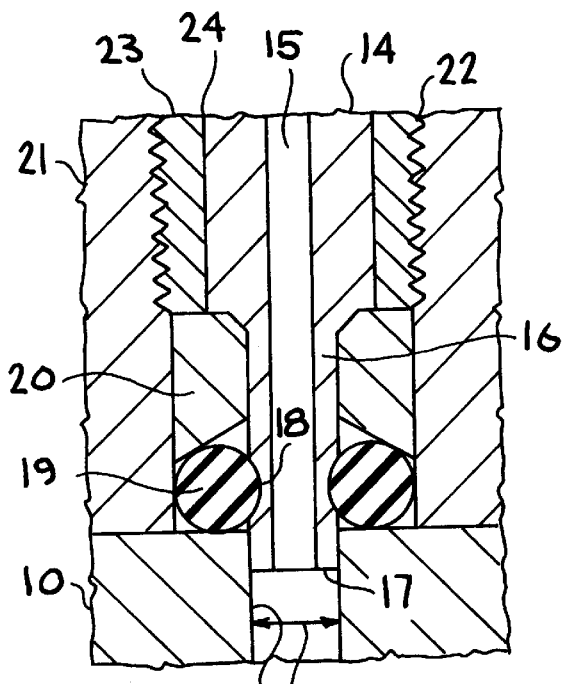
FIGS. 1 and 2 are cross-sectional views of an embodiment of a miniature connector made in accordance with the present invention, and utilize a compression screw to push a ferrule which compresses an o-ring, with FIG. 1 showing the uncompressed position and FIG. 2 showing the compressed position.

The present invention is directed to microfluidic interconnects, and more specifically to fluidic connectors for introducing liquids or gases to and extracting them from microfluidic devices. If microfluidic devices are to achieve wide-scale use, a standardized system must be established for interfacing the devices with each other and with larger fluidic components and systems, such as pumps, filters, syringes, aerosol collectors, flow cytometers, and chemical analyzers. Some of the large-scale connection systems include Luer fittings, high pressure liquid chromatography (HPLC) connectors, etc. Until now, no widely applicable, easy to assemble and disassemble, small-sized connection system has been demonstrated for interfacing to the mm and sub-mm scale channels found in microfluidic devices.

Microfluidic devices, with dimensions from microns to millimeters, are typically made from silicon, glass, and plastic using fabrication techniques, such as photolithography, etching, electroplating, thin film deposition, conventional machining, embossing, and bonding. These devices have components such as channels, pumps, valves, sensors, reaction chambers, particle separators, and electronics. The miniature connectors of the present invention provide a means for interfacing microfabricated fluidic devices to larger fluid components, such as pumps, valves, syringes, and aerosol collectors, and to each other. The miniature connectors of the present invention enable introducing microliter and sub-microliter quantities of solutions into the microfabricated fluidic devices. The connector of the present invention joins HPLC stiff (PEEK) tubing to silicon, glass, or plastic microfabricated fluidic devices enabling ml-sized volumes of sample solutions to be merged with $\mu l$ or sub-$\mu l$ sized devices, or for interconnecting various microfluidic devices to each other.

The miniature connectors described hereinafter can be used with many types of microfluidic devices with the incorporation of packaging that is easy to design and manufacture. In addition, since standard tubing is used, it makes it simple to adapt to other types of connection arrangements. Other advantages include easy installation, no epoxy required, quick connection and disconnection with no tools required, small footprint, helium leak-tight, high working pressures, and small dead volumes. For these reasons, the connector of this invention has the potential to become a connector standard for microfluidic devices. One embodiment of the connector has been extensively experimentally utilized with excellent results, allowing for easy and effective exchange of microfluidic devices and the introduction of different solutions into the microfluidic devices. In addition, due to the small footprint of the connector, such allows for multiple connections without compromising the small device size, and thus enables the use of low-profile socket-type multi-connectors, such as the linear manifold and polar manifold arrangements described hereinafter.

Figure 2:
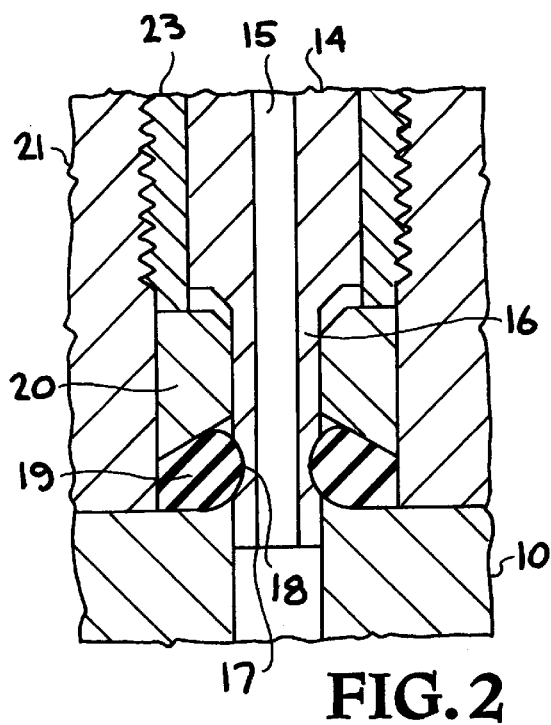

Referring now to the drawings, FIGS. 1 and 2 illustrate an embodiment of a miniature fluid connector using a tube having a formed tip with the tip in an opening of a member, an o-ring, a ferrule, and a compression screw, located, for example, in a pc board/package. In this example, as shown in FIG. 1, the microfabricated fluidic device, such as a fluidic chip, is, for example, made of glass with a drilled fluidic input port or opening 11 having, for example, a 1 mm diameter, as indicated by arrow 13. A stiff tubing 14, such as a HPLC-PEEK tubing, includes an opening 15 and a tip 16 that is machined such that the end 17 thereof fits inside the drilled input port 11 in the fluidic chip 10. A tight tolerance between the machined tubing tip 16 OD and the drilled port or opening 11 ensures a small dead volume. A notch or groove 18 is machined or otherwise formed into the tubing tip 16 so that it accepts a small o-ring 19, and a chamfered ferrule or compression ring 20 extends around tip 16. Both the o-ring 19 and ferrule 20 are slipped over the end 17 of tip 16 prior to insertion of the end 17 of tip 16 into the opening or inlet port 11 of chip 10. The packaging member for the microfluidic device or chip 10, which can be made of PC board, plastic, aluminum, or other material, indicated at 21, is drilled or tapped to form an opening 22, which is fit with a knurled compression screw 23, which has a hollow core 24 so that tubing 14 can be inserted therethrough such that the end 17 of tip 16 of tubing 14 can be inserted into port or opening 11 in chip 10. The footprint of the connector of FIGS. 1 and 2 is only as large as the OD of the compression screw 23. When the compression screw 23 is tightened, it moves downwardly, as shown, in opening 22 in member 21, and pushes the ferrule 20 against the o-ring 19, as shown in FIG. 2. This compresses the o-ring 19, which serves two purposes: (1) it forms a leak-tight seal around tubing tip 16, and (2) it presses the o-ring 19 into the o-ring groove 18, clamping onto the tip 16 of tubing 14 and providing mechanical retention strength. No tool is required and finger tightening of the compression screw 23 is sufficient for the connector to withstand hundreds to thousands of psi since the inner diameter of the tubing opening 15 and the opening or port 11 of the device or chip 10 are small, and even high pressures impart only a small repulsive force on the tubing 14. Because the tubing 14 is not attached to the compression screw 23, it does not twist when the compression screw is tightened, making it possible to use the connector even when the opposite end of the tubing is rigidly held. By loosening the compression screw ¼ to ½ turn, the tubing 14 can be removed from the compression screw. When disconnecting the tubing 14, the o-ring 19 and ferrule or compression ring 20 remain trapped by the compression screw 23, and the connection can be reestablished simply by reinserting the tubing 14 and retightening the compression screw 23.

Figure 3:
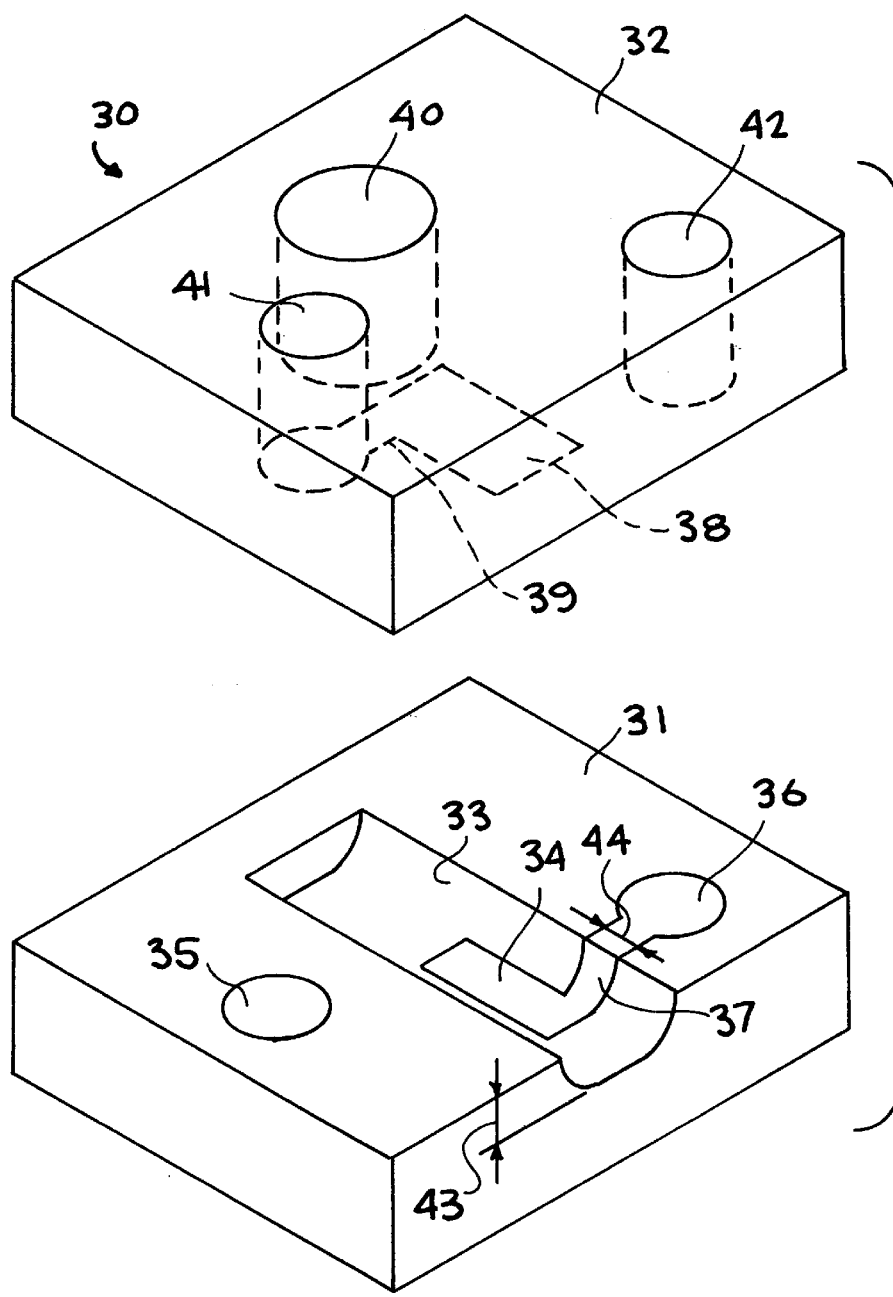
FIGS. 3 illustrates the top and bottom plates of a fusion-bonded glass impedance sensor to which a miniature connector of the invention is adapted to be connected.

FIG. 3 illustrates in break-away an out-of-scale embodiment of a microfluidic device or microfluidic chip for which the connector of FIGS. 1 and 2 was designed, and the device of FIG. 3 comprises an in-line particle impedance sensor indicated generally at 30. The sensor 30 consists of two glass substrates or plates 31 and 32 which are fusion-bonded together. The bottom glass substrate 31 has an etched microchannel 33 with an electrode 34 at the bottom of the channel 33, and two electrode contacts 35 and 36 on the surface of substrate 31, electrode 34 and electrode contact 36 having an interconnect 37. The top glass substrate 32 has an opposed electrode 38 having an interconnect 39, and three ultrasonically-drilled holes 40, 41, and 42 for making fluidic and electrical connection to the sensor 30. Hole 40 aligns with microchannel 33, and holes 41 and 42 align with electrode contacts 35 and 36. Having both the fluidic and electrical connections on the same side of the sensor 30 facilitates surface mounting to a PC board. Compressible conductive polymer cylinders are used to make electrical contact, and the sensor 30 is clamped with its package without the use of adhesives or solder, making it easy to exchange the fluidic chips. By way of example, the depth of the microchannel 33 is 20 $\mu$m, as indicated by arrow 43, and the width of the interconnect 37 is 10 $\mu$m, as indicated by the arrow 44.

Extensive testing has been performed utilizing the microfluidic interconnect of FIGS. 1 and 2, primarily in the course of testing the microfluidic chips similar to that of FIG. 3, for which the connector of FIGS. 1 and 2 was designed. For those tests, one routinely mounted, remounted, and exchanged the microfluidic chips which was possible because the fluidic connector does not require epoxy or any tools for assembly or disassembly, and finger tightening was sufficient to provide a leakproof seal. The sealing was tested and the connector was found to be helium leak-tight. It was conservatively estimated that the pressure which the connector can withstand is at least 1000 psi, based on the approximate load applied when fluids were manually injected through the microfluidic chip.

Figure 5:
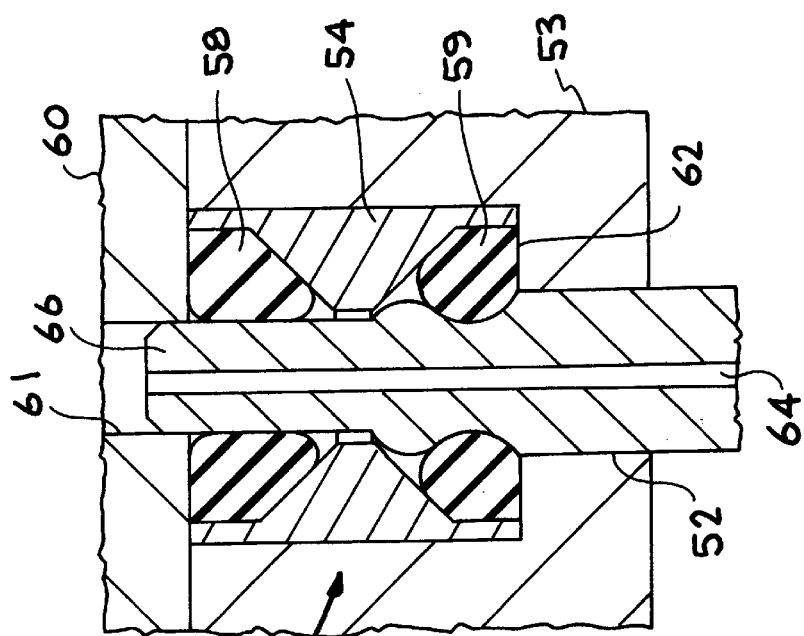
FIGS. 4 and 5 illustrate an embodiment of the fluidic connector of the invention using two o-rings contained in a cartridge, with FIG. 5 showing the tubing inserted into the cartridge.
Figure 4:
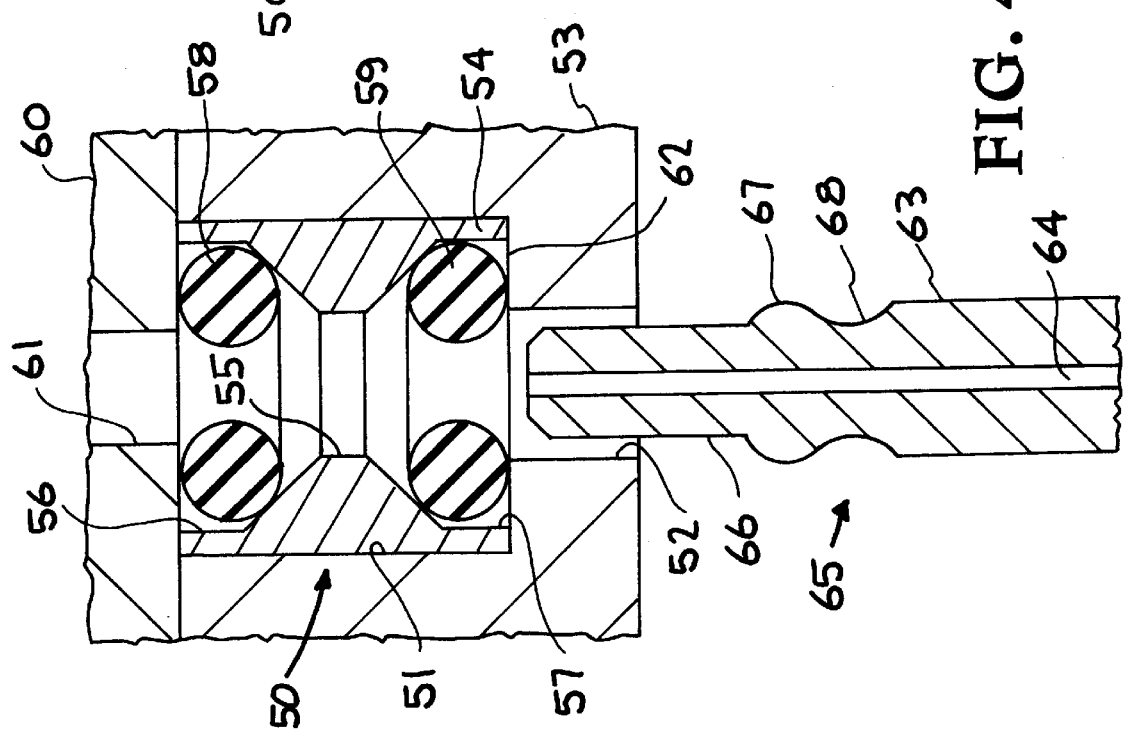
Figure 15:
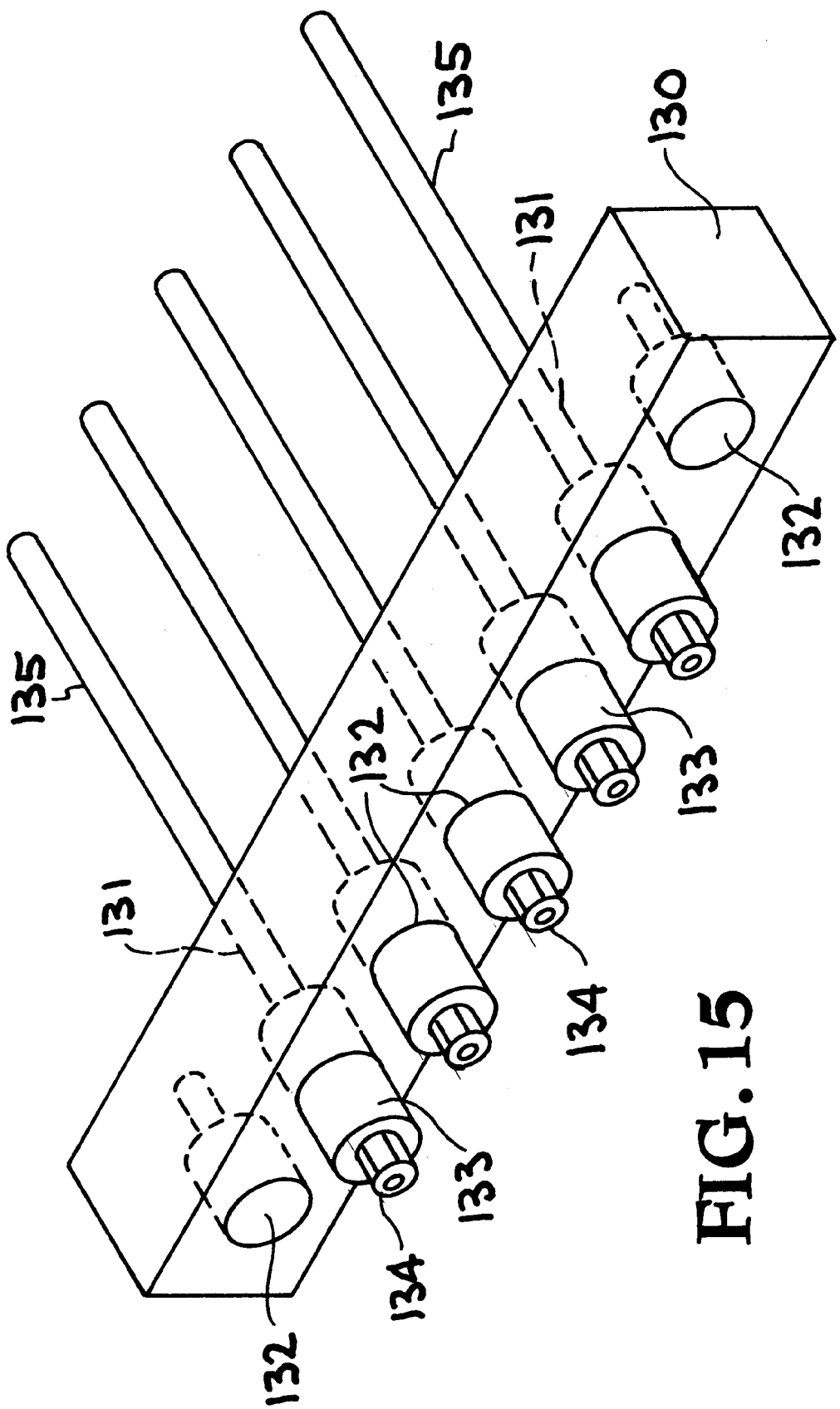

Another miniature fluid connector embodiment is illustrated in FIGS. 4 and 5. In this embodiment a cartridge containing two o-rings is inserted into a counter-drilled hole in the packaging, as shown in FIG. 15. Handling of the o-rings is greatly simplified by incorporating them into a cartridge. Once the package is assembled, the cartridge remains trapped and does not have to be reinstalled. The tubing, machined or otherwise, formed such that the tip has a straight section for fitting into the microfluidic device, and an o-ring groove and lip for engaging the cartridge and an outer o-ring, is inserted through the cartridge. In this embodiment, inserting the tube compresses the outer o-ring against an o-ring groove and lip on the tubing, providing mechanical retention strength, as shown in FIG. 5. The inner o-ring also is compressed, forming a seal with the microfluidic device.

As shown in the embodiment of FIGS. 4 and 5, the fluidic connector comprises a cartridge, generally indicated at 50 inserted into a countersink or hole 51 in an opening 52 of a packaging member 53. The cartridge 50 includes a ring member 54 having an opening 55 and grooves 56 and 57 in which o-rings 58 and 59 are located. The inner o-ring 58 is in contact with a microfluidic device 60 having an opening or fluidic port 61, and the outer o-ring 59 is in contact with a surface 62 of countersink 51 in packaging member 53. A tubing 63 has a central opening or passageway 64 and a reduced diameter tip generally indicated at 65 having a straight end section 66, a lip 67, and an o-ring groove 68. When the tubing 63 is inserted through cartridge 50 such that a portion of end section 66 is inserted into fluidic port 61 of device 60, as shown in FIG. 5, the o-rings 58 and 59 are compressed, as described above and as seen in FIG. 5, to provide a seal between packaging member 53 and microfluidic device 60 and to provide a seal above tubing 63 and packaging member 53, as well as to provide mechanical retention of the tubing 63 in the cartridge 50 due to the outer o-ring ring 59 being compressed into o-ring groove 68 of tubing tip 65. Tests carried out on this embodiment have shown that after numerous connections and disconnections, the connector withstood 750 psi.

The o-ring material is an appropriate polymer which has adequate compressibility, and optimizes wear resistance, high temperature lifetime, or chemical inertness, depending on the demands of the specific application. A positive snapping can be felt when inserting the tubing, providing an installer with assurance that the connection has been made. The tubing can be removed by pulling on it with sufficient force, and the connection can be reestablished simply by reinserting the tubing. In the connector of FIGS. 4 and 5, the compression screw of the embodiment of FIGS. 1 and 2 is eliminated, and the footprint of the connector of FIGS. 4 and 5 is determined by the O.D. of the cartridge. Once again, it is straight-forward to design packaging for use with this FIGS. 4 and 5 connector, and no tools are required for installing or using the connector.

Figure 6:
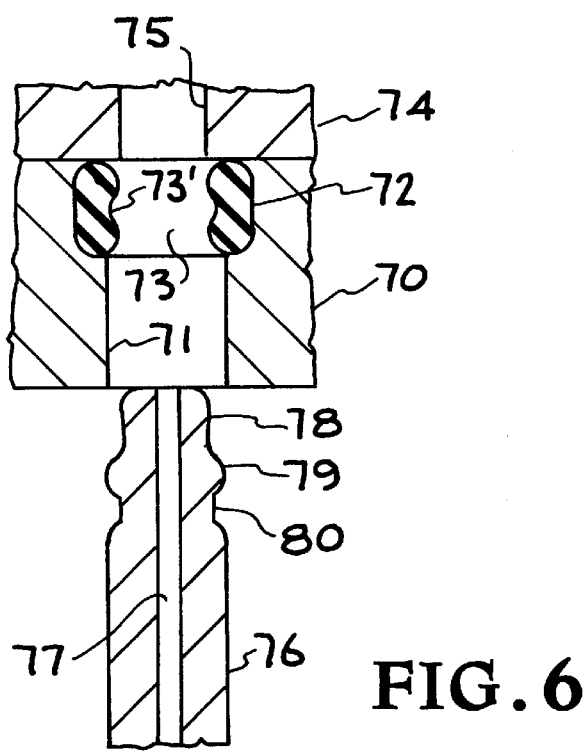
FIGS. 6 and 7 illustrated an embodiment of the connector using a molded gasket in place of the o-rings of the FIGS. 4 and 5 embodiment, with FIG. 7 showing the tubing inserted into the molded gasket.
Figure 7:
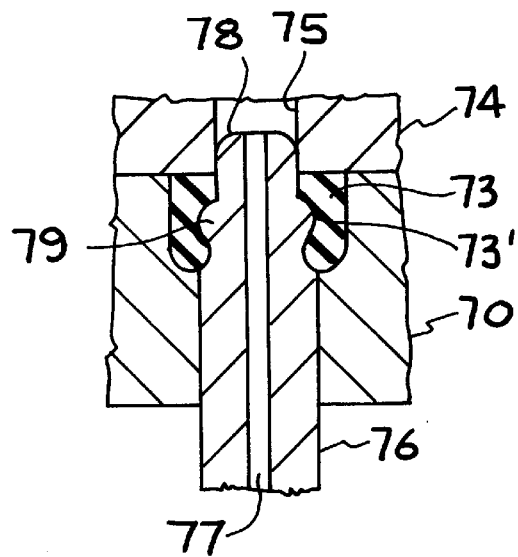

Another embodiment of the fluidic connector of the present invention is illustrated in FIGS. 6 and 7. In this embodiment, a molded gasket replaces the cartridge and o-rings of the connector embodiment of FIGS. 4 and 5. The molded gasket is inserted into a counter-sink or counter-drilled hole in the package member, as shown in FIG. 6. When the machined or otherwise formed tubing is inserted through the package member, as shown in FIG. 7, its tip fits into the opening or port of the microfluidic device, and a lip on the tubing engages with the gasket, compressing it to form a seal and provide mechanical retention strength. The tube can be removed by pulling on it with sufficient force and can be reinserted multiple times. In the FIGS. 6 and 7 embodiment of the connector, the footprint is determined by the OD of the molded gasket, which is slightly larger than the OD of the tubing itself.

Referring now to FIGS. 6 and 7, a packaging member 70 includes an opening 71 having an enlarged or counter-sink section 72 in which a molded gasket 73 having an indentation 73' is positioned, as shown in FIG. 6. A microfluidic device 74 having an opening or port 75 is positioned adjacent member 70. A tube 76 has a central passageway 77, a reduced diameter end section 78, a lip 79, and a groove 80. As shown in FIG. 7, the tube 76 is inserted through opening 71 in member 70, through gasket 73, such that the end section 78 extends into opening 75 of device 74, and lip 79 is located in indentation 73' of molded gasket 73, whereby a seal is formed between member 70 and device 74, and mechanical retention is provided by the lip 79 being inserted into indentation 73' of gasket 73.

Figure 8:
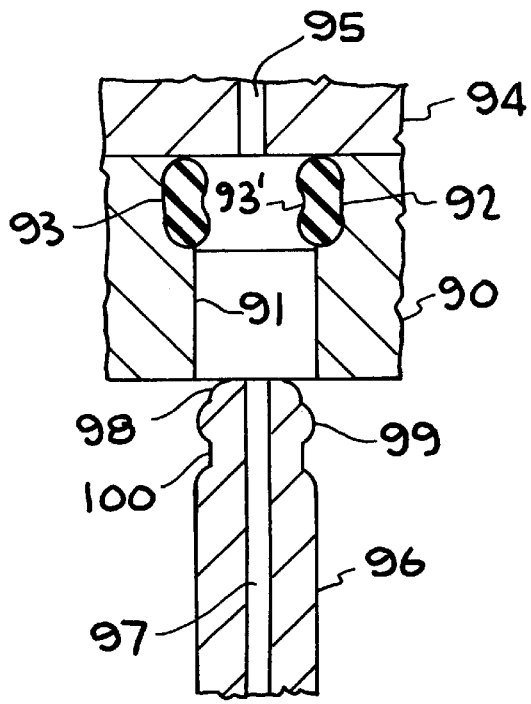
FIGS. 8 and 9 illustrate an embodiment of a connector used to form a seal with the tubing making a butted contact to the microfluidic device, with FIG. 9 showing the tubing inserted.
Figure 9:
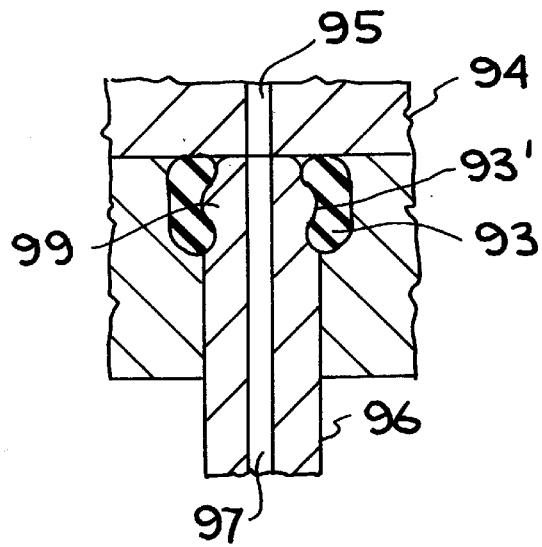

FIGS. 8 and 9 illustrate another embodiment of the miniature fluidic connector in which the tubing is butted against an input port of the microfluidic device, rather than an end of the tubing being inserted into the port as in FIGS. 6 and 7, for example. As seen in FIG. 8, the packaging member 90 includes an opening 91 and countersink 92 in which a molded gasket 93 having an indentation 93' is located similar to the FIG. 6 embodiment. A microfluidic device 94 has an input port or opening 95 of a diameter smaller than port 75 of FIG. 6. A tube 96 has a central opening 97, a reduced diameter end section 98, a lip 99 and groove 100, with end section 98 of tube 96 being shorter than end section 78 of tube 76 in FIG. 6. When the tube 96 is inserted into member 90, as shown in FIG. 9, the end section 98 abuts device 94 such that opening 97 of tube 96 aligns with port 95 in device 94, and a seal is formed by molded gasket 93, and mechanical retention is provided by lip 99 being inserted into indentation 93' of gasket 93, as described above with respect to FIG. 7. The butted connection arrangement of the embodiment of FIGS. 8 and 9 allows the fluidic connector to be used with microfluidic devices which were not specifically designed for use with the connector. In addition, some microfluidic devices cannot be fabricated with the relatively large (about 1 mm) holes required for insertion of the end of the tubing thereinto, as seen in the FIGS. 1 and 2, 4 and 5, and 6 and 7 embodiments, and require the butted type of connector, as in FIGS. 8 and 9.

Figure 10:
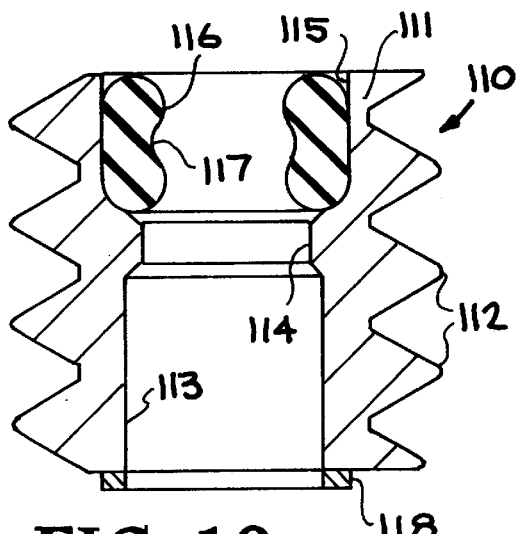
FIGS. 10 and 11 show cross-sectional and end views of an embodiment of the connector with a set-screw type cartridge which houses a molded gasket, with FIG. 10 being taken along the line 11—11 of FIG. 11.
Figure 11:
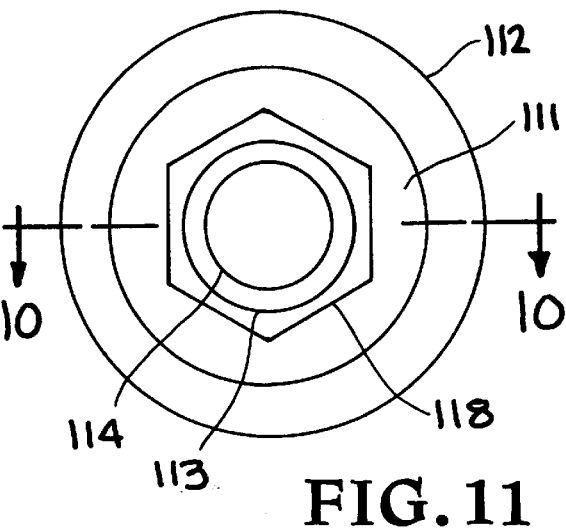

FIGS. 10 and 11 illustrate another type of cartridge connector wherein the cartridge body is made out of a set screw. The set screw may be made of plastic, stainless steel, or other material. FIG. 10 shows a cross-section of the cartridge and FIG. 11 shows an end view thereof. The cartridge has a hollow core and is counter-drilled to accept either o-rings or a molded gasket. As seen in FIGS. 10 and 11, the cartridge, generally indicated at 110, includes a member body or housing 111 having external threads 112, an opening 113 having a reduced diameter section 114 and an enlarged diameter or counter-sink section 115 in which a molded gasket 116, having an indentation 117, is mounted. The body 111, as seen in FIG. 11 includes a hexagonal shaped member 118 which extends around opening 113 and enables turning of the body 111 and threads 112.

Figure 12:
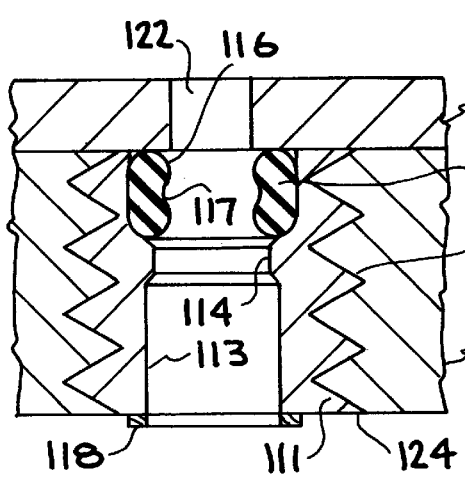
FIGS. 12, 13, and 14 illustrate another embodiment of the connector using the set-screw type cartridge, with FIG. 12 being taken along the line 12—12 of FIG. 13, and FIG. 14 showing the tubing inserted into the cartridge of FIG. 12.
Figure 14:
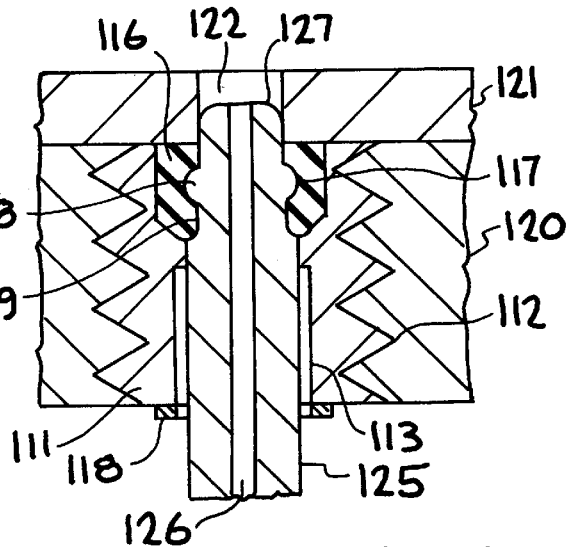
Figure 13:
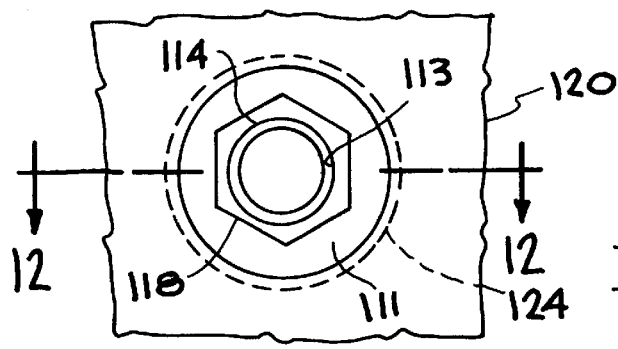

FIGS. 12 and 14 illustrate how the set screw cartridge of FIGS. 10 and 11 is used as a connector, and corresponding components are given corresponding reference numerals. A package member 120, for a microfluidic device 121 having a port or opening 122, is drilled and tapped to form an opening 124, and the connector cartridge is screwed into the opening 124 with a hex key, now shown, via hexagonal member 118, as shown in FIGS. 12 and 13. A tube 125, constructed as in the embodiment of FIGS. 6 and 7, for example, to include central opening 126, a reduced diameter end section 127 a lip 128, and a groove 129, is inserted through cartridge 110 such that end section 127 extends into port 122 of device 121, and lip 128 is located in indentation 117 of gasket 116, as shown in FIG. 14, to provide a seal and mechanical retention as described above. An advantage of the embodiment of FIGS. 12 through 14 is that the cartridge can be tightened until there is sufficient pressure between the package member 120 and the microfluidic device 121 to ensure a leakproof seal is formed. This preload is created locally at the fluidic connection, reducing requirements for stiffness of the packaging.

Figure 16:
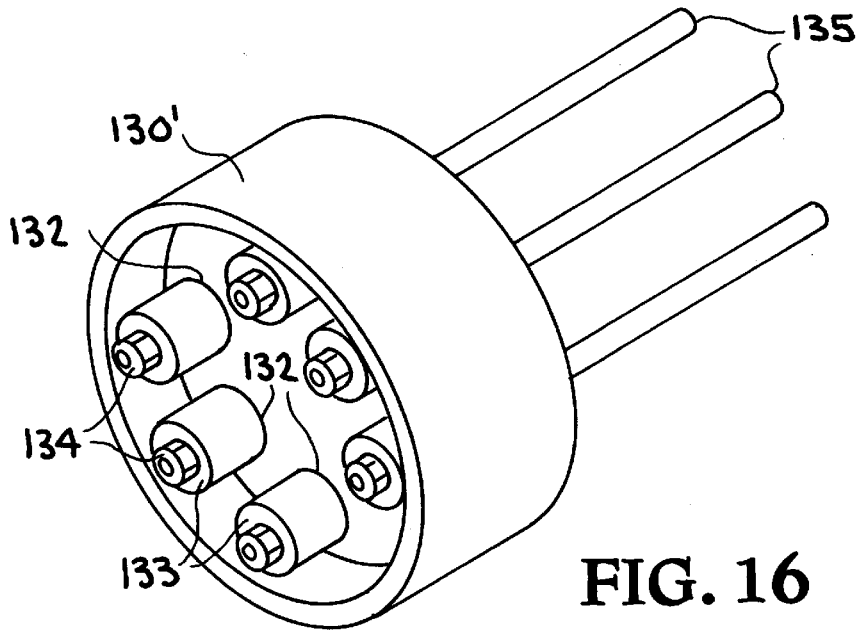
FIGS. 15 and 16 illustrate embodiments of multiple miniature (milli to micro) fluidic connector manifolds, with FIG. 15 being of a linear manifold or strip type connector and FIG. 16 being of a polar manifold or circular type connector.

FIGS. 15 and 16 illustrate embodiments incorporating several miniature fluidic connectors into a manifold or connector array. This allows for multiple fluidic input and/or output connections in a small area, analogous to a ribbon-cable or polar (military-style) connector for an electronic circuit. If desired, the interconnects may be mounted to form multiple separate connections rather than as a manifold.

FIG. 15 illustrates a linear manifold embodiment wherein a support member 130 is provided with a plurality of openings 131 (two shown in dash lines) which include counter-sinks or enlarged outer sections 132. A connector cartridge assembly 133, such as cartridge 50 of FIGS. 4 and 5 or cartridge 110 of FIGS. 10 through 14, having connector tubing 134 therein for fluidic connection to tubes 135 secured to support member 130. FIG. 16 illustrates an embodiment of a polar manifold, with the miniature fluidic connectors mounted therein, as in FIG. 15, and corresponding components are given corresponding reference numerals.

It has thus been shown that the present invention provides miniature fluidic interconnects which enables introducing fluids to microfabricated fluidic devices, without the use of tools or adhesives. The interconnects can be easily installed, removed, and reinstalled, and have a small footprint which enables numerous connectors to be located in a small area. The miniature fluidic connectors produce seals that are helium leak-tight, the tubing does not twist when connecting, and can operate under high fluid pressure applications. The connector may be constructed to enable application for various types of microfluidic devices, and may be mounted by flush (abut) or by inserted applications. The microfluidic connectors of the present invention have numerous applications including portable and/or deployable counter-biological warfare systems, including PCR and flow-cytometer-based instruments, or may be used for sequencing instrumentation, and micro-fluidic-based medical diagnostic instruments, and instruments for drug discovery.

While particular embodiments, materials, and parameters have been described or illustrated to exemplify and teach the principles of the invention, such are not intended to be limiting. Modifications and changes may become apparent to those skilled in the art, and it is intended that the invention be limited only by the scope of the appended claims.

What is claimed is:

1. A micro-fluidic interconnect comprising:
   a tube having a reduced external diameter end section,
   said tube additionally including at least one external groove in said reduced diameter end section,
   at least one seal adapted to be compressed in said external groove when said tube is installed in an opening of a first associated member, said reduced diameter section of said tube extending into an opening in a second associated member, said at least one seal being constructed to form a leak-tight seal adjacent such a second associated member and to provide mechanical retention of said tube, a compression screw for compressing said at least one seal, and a ferrule located intermediate and in contact with said at least one seal and with said compression screw.

2. The interconnect of claim 1, wherein said at least one seal comprises an o-ring.

3. A plurality of interconnects of claim 1 mounted to form a manifold of multiple separate connectors.

4. A miniature fluidic connector providing leak-tight fluid interconnection between two adjacent members, comprising:

a first member having a fluid passageway therein, a second member having an opening therein, said fluid connector including a tube having a reduced diameter section containing at least an external groove, and at least one seal adapted to be compressed into said groove when said tube is inserted into said opening in said second member to form a seal around said tube and to provide mechanical retention of said tube in said opening, said seal is an o-ring, and additionally including a ferrule located about said reduced diameter section of said tube, and additionally including a compression screw mounted in said opening of said second member for compressing said ferrule and said o-ring to form the seal at least about said tube and to provide the mechanical retention of the tube in said opening of said second member.

5. The connector of claim 4 wherein an end of said reduced diameter section of said tube extends into said passageway in said first member.

6. The connector of claim 4, wherein said first member comprises a micro-fluidic device and wherein said second member comprises a packaging for the micro-fluidic device.

* * * * *